United States Patent
Goss

[11] 3,729,792
[45] May 1, 1973

[54] METHOD OF MAKING WELDING TIP FOR CUTTING TORCH

[75] Inventor: Herbert C. Goss, Glenshaw, Pa.

[73] Assignee: Goss Gas, Inc., Glenshaw, Pa.

[22] Filed: Nov. 3, 1971

[21] Appl. No.: 195,174

Related U.S. Application Data

[62] Division of Ser. No. 92,792, Nov. 25, 1970, Pat. No. 3,648,934.

[52] U.S. Cl. ............................................. 29/157 C
[51] Int. Cl. ............................................. B21d 53/00
[58] Field of Search ............... 29/157 C; 239/390, 239/391, 416.4, 424.5, 600; 266/23 P

[56] References Cited

UNITED STATES PATENTS

| | | | |
|---|---|---|---|
| 3,648,934 | 3/1972 | Goss | 29/157 C |
| 1,668,107 | 5/1928 | Dillon | 239/391 |
| 3,299,939 | 1/1967 | Marra | 266/23 P |
| 3,477,112 | 11/1969 | Yerkins | 239/424.5 |
| 1,409,220 | 3/1922 | Leighty et al | 239/390 |
| 1,274,053 | 7/1918 | Jenkins | 239/391 |

Primary Examiner—Charles W. Lanham
Assistant Examiner—M. J. Keenan
Attorney—Thomas H. Murray et al.

[57] ABSTRACT

A welding tip for a cutting torch is made by forming a cylindrical head with a central stem at one end and an axial socket in the other end, and a ring of drilled passages extending from inlets around the base of the stem to the inner end of the socket. A solid rod with an inner end portion that will fit snugly in the head socket is drilled to provide it with a single passage lengthwise through it to form a nozzle. This passage is reamed to taper it from the inner end of the rod substantially to its outer end and to provide the large end of the passage with a diameter great enough to register with the inner ends of all of the head passages when the nozzle is inserted in the socket and sealed therein.

2 Claims, 3 Drawing Figures

Patented May 1, 1973 3,729,792

METHOD OF MAKING WELDING TIP FOR CUTTING TORCH

CROSS-REFERENCES TO RELATED APPLICATIONS

This application is a division of copending application Ser. No. 92,792, filed Nov. 25, 1970, now U.S. Pat. No. 3,648,934.

One type of cutting torch on the market has a head in which a cutting tip is clamped by means of a ring nut. The cutting tip has a central stem projecting a short distance from its inner end and there is an oxygen passage that extends through the stem and the center of the rest of the tip. Around the base of the stem the cutting tip is provided with a plurality of inlets that admit a fuel gas, such as acetylene gas, to a ring of passages that conduct the gas to outlet apertures in the outer end of the tip around the central oxygen outlet. When the tip is inserted in the socket of the torch head the stem engages the side wall of the reduced inner end of the socket and limits the distance the tip can be inserted, so that the acetylene inlets will be spaced outwardly from a lateral inlet port for acetylene or the like in the side of the socket. The oxygen inlet port for the socket is at the inner end of the socket. It often is desirable to use such a cutting torch as a welding torch, but this would require a different tip because only a single outlet from the tip is wanted and the oxygen supply to the tip must be shut off.

It is an object of this invention to provide a method for making a welding tip that can be substituted for the cutting tip of a cutting torch of the type just described.

The preferred embodiment of the invention is illustrated in the accompanying drawings, in which.

Figure 1:
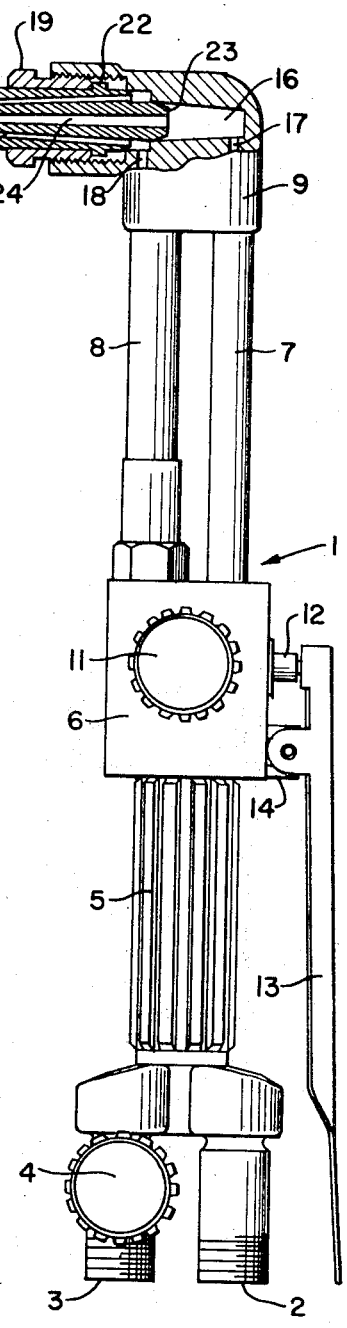
FIG. 1 is a side view of the cutting torch with the cutting tip in place and with parts broken away.

Referring to FIG. 1 of the drawings, a conventional welding torch 1 is shown which has two inlets, one beside the other. The right-hand inlet 2 is to be connected to an oxygen tank, and the other one 3 to a tank of fuel gas, such as acetylene. The acetylene inlet is controlled by a valve 4. The two lines feed into parallel passages in the body 5 of the torch that also extend through a valve housing 6. The outlets of this housing are connected by parallel metal tubes 7 and 8 with the head 9 of the torch. There is an opening in the valve housing connecting its oxygen passage with the acetylene passage and controlled by a throttling valve member 11 projecting from one side of the housing. Between the throttling valve and oxygen tube 7 the oxygen passage in the valve housing normally is closed by a valve member having a stem 12 projecting from the housing. Connected to this stem is one end of a lever 13 that is pivoted to a projection 14 on the housing. By depressing the opposite end of the lever, oxygen is supplied through tube 7 to the torch head.

Tubes 7 and 8 open into the side of a socket 16 in the torch head. The oxygen inlet port 17 is located at the inner end of the reduced inner end portion of the socket, while the acetylene inlet port 18 is located about half-way between the other port and the open end of the socket. Outwardly beyond the acetylene port the socket is enlarged and provided with a screw thread for receiving a ring nut 19. This nut holds a cutting tip 21 in the head. The tip is provided with a collar 22 that the inner end of the nut bears against. The tip is provided at its rear or inner end with a short central stem 23 that is pressed against the side wall of the reduced inner end of the socket to limit the distance the nut can force the tip into the head. Extending through the stem and forward through the rest of the tip is an axial passage 24 for oxygen. The tip also is provided with a ring of passages 25 extending forward through it from inlets around the base of stem 23. These passages receive acetylene or other fuel gas from inlet port 18. Stem 23 prevents oxygen from inlet port 17 from reaching those passages. A mixture of oxygen and acetylene issues steadily from passages 25 but the main supply of oxygen flows from the tip only when valve lever 13 is depressed to admit oxygen to the head socket.

Figure 2:
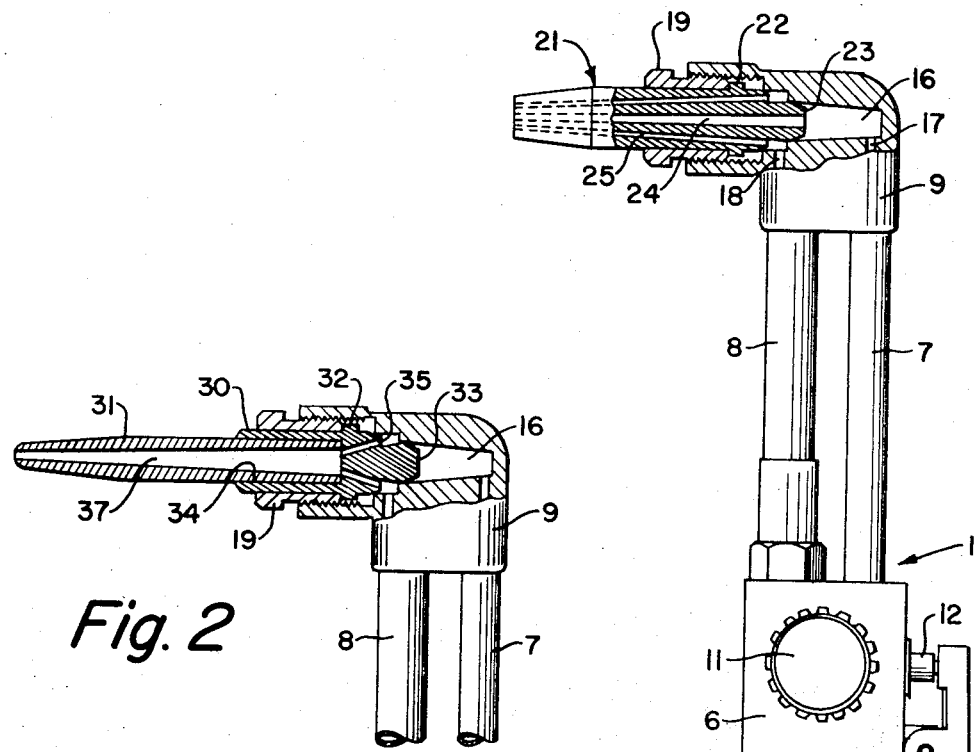
FIG. 2 is a similar view of a torch head with a welding tip substituted for the cutting tip.
Figure 3:
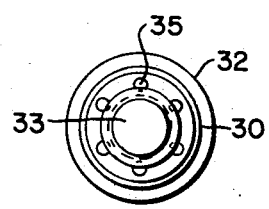
FIG. 3 is an enlarged view of the inner end of the welding tip.

It is a feature of this invention that this torch also can be used as a welding torch by simply changing the tip. As shown in FIG. 2, the welding tip is made from a head 30 and a nozzle 31 that are brazed together. The head has the same outward appearance as the inner end portion of the welding tip. It is a cylindrical member encircled by an integral collar 32 for clamping it in the torch head and has a central stem 33 of the same size and shape as the cutting tip stem 23. However, the stem is solid; there is no passage through it. The outer end of the head is drilled to provide it with an axial socket 34 for the nozzle. After this socket is formed, a ring of fuel gas passages 35 is drilled in the head from the base of the stem forward to the inner end of the socket as shown in FIGS. 2 and 3. These passages converge toward the axis of the head so that their inner ends are spaced radially inward from the side wall of the socket.

The nozzle 31 of the welding tip is formed from a rod that has an inner end portion that will fit snugly in socket 34. This rod is drilled along its axis to provide a single passage 37 extending through it from end to end. As it is desirable that the passage taper toward the outer end of the nozzle and that the inner end of the passage be large enough to receive the inner ends of all of the inclined passages 35 in the head, the passage through the nozzle then is reamed to taper it from its inner end substantially to its outer end. The passage is reamed out enough to give it a wall thickness at its large end that is substantially equal to the width of the annular space around the inner ends of the head passages 35. In other words, the wall of the nozzle encircles the inner ends of the head passages so that all of them open into the nozzle passage. After the nozzle has been inserted in the head socket it is silver soldered in the head to seal it therein.

It will be seen that the welding tip is interchangeable with the cutting tip. The welding tip has only a single passage through it and this is fed only by the fuel gas from tube 8. The stem 33, fitting snugly in the inner end of head socket 16, prevents any oxygen from reaching the fuel gas inlets in case lever 13 is depressed inadvertently, and of course there is no passage through the stem for oxygen. The stem also limits the distance the tip can be inserted in torch socket 16.

According to the provisions of the patent statutes, I have explained the principle of my invention and have

I claim as my invention:

1. The method of making a welding tip, comprising forming a cylindrical head with a central stem at one end and an axial socket in the other end and a ring of drilled passages extending from inlets around the base of the stem to the inner end of the socket, providing a solid rod that has an inner end portion that will fit snugly in said socket, drilling a single passage lengthwise through said rod to form a nozzle, reaming the nozzle passage to taper it from said inner end of the rod substantially to its opposite end and to provide the large end of the passage with a diameter great enough to register with the inner ends of all of said head passages when said inner end is inserted in the socket, inserting in said socket the end of the nozzle provided with the large end of the tapered passage, and sealing the nozzle in the socket.

2. The method defined in claim 1, in which said socket is formed before said head passages are drilled, said head passages are drilled in positions to space their inner ends from the side wall of said socket, and said reaming enlarges said drilled rod passage until the wall thickness of the inner end of the nozzle is substantially equal to the width of the annular space around the inner end of the head passages.

* * * * *